United States Patent
Furuya

(10) Patent No.: US 12,545,519 B2
(45) Date of Patent: Feb. 10, 2026

(54) AUTOMATED WAREHOUSE

(71) Applicant: DAIFUKU CO., LTD., Osaka (JP)

(72) Inventor: Haruhito Furuya, Tokyo (JP)

(73) Assignee: DAIFUKU CO., LTD., Osaka (JP)

( * ) Notice: Subject to any disclaimer, the term of this patent is extended or adjusted under 35 U.S.C. 154(b) by 456 days.

(21) Appl. No.: 18/258,927

(22) PCT Filed: Jul. 2, 2021

(86) PCT No.: PCT/JP2021/025168
§ 371 (c)(1),
(2) Date: Jun. 22, 2023

(87) PCT Pub. No.: WO2022/137610
PCT Pub. Date: Jun. 30, 2022

(65) Prior Publication Data
US 2024/0300742 A1    Sep. 12, 2024

(30) Foreign Application Priority Data

Dec. 24, 2020  (JP) ................................ 2020-215407

(51) Int. Cl.
*B65G 1/137* (2006.01)
*B65G 1/04* (2006.01)
(52) U.S. Cl.
CPC ......... *B65G 1/1375* (2013.01); *B65G 1/0435* (2013.01); *B65G 1/0492* (2013.01)
(58) Field of Classification Search
CPC .. B65G 1/1375; B65G 1/0407; B65G 1/0435; B65G 1/0485; B65G 1/065; B65G 1/04; B65G 1/0492
See application file for complete search history.

(56) References Cited

U.S. PATENT DOCUMENTS

2013/0103248 A1    4/2013  Ogawa
2017/0341862 A1*  11/2017  Aschauer ............. B65G 1/0435
(Continued)

FOREIGN PATENT DOCUMENTS

CN    109789971 A      5/2019
EP      0733563 A1 *   9/1996  ........... B65G 1/0492
(Continued)

OTHER PUBLICATIONS

Combined Chinese Office Action and Search Report issued Sep. 25, 2025, in corresponding Chinese Patent Application No. 202180087055.9 (with English Translation and English Translation of Category of Cited Documents), 23 pages.
(Continued)

*Primary Examiner* — Timothy R Waggoner
(74) *Attorney, Agent, or Firm* — Oblon, McClelland, Maier & Neustadt, L.L.P.

(57) ABSTRACT

An automated warehouse includes: a storage shelf; a mobile body including a base; a first arm supported by the base; a second arm supported by the base; and a movable portion capable of causing an article to move between the mobile body and a first transport mechanism and between the mobile body and a second transport mechanism. In a state where the mobile body is located at a first transfer position, the support position of the second arm is fixed and the support position of the first arm is changed depending on a length of the article in a first direction. Alternatively, in a state where the mobile body is located at a second transfer position, the support position of the first arm is fixed and the support position of the second arm is changed depending on the length of the article in the first direction.

10 Claims, 10 Drawing Sheets

(56) References Cited

U.S. PATENT DOCUMENTS

2018/0370729 A1* 12/2018 Ueda .................. B65G 1/065
2022/0204271 A1*  6/2022 Iwata ................. B65G 1/1375

FOREIGN PATENT DOCUMENTS

| | | |
|---|---|---|
| EP | 2 729 387 A2 | 5/2014 |
| JP | 2-1 47486 U | 12/1990 |
| JP | 2000-118626 A | 4/2000 |
| JP | 2000-272722 A | 10/2000 |
| JP | 2005-187158 A | 7/2005 |
| JP | 2005-219833 A | 8/2005 |
| JP | 2008-290807 A | 12/2008 |
| JP | 2012-184085 A | 9/2012 |
| JP | 2012-188245 A | 10/2012 |
| JP | 5605430 B2 | 10/2014 |
| JP | 2016-60624 A | 4/2016 |
| JP | 2017-81755 A | 5/2017 |
| JP | 2017-149526 A | 8/2017 |
| JP | 6428367 B2 | 11/2018 |
| JP | 2020-189711 A | 11/2020 |
| WO | WO 2013/006879 A2 | 1/2013 |
| WO | WO 2020/235238 A1 | 11/2020 |

OTHER PUBLICATIONS

International Search Report issued Sep. 14, 2021 in PCT/JP2021/025168 filed on Jul. 2, 2021, 2 pages.
Combined Chinese Office Action and Search Report issued May 14, 2025, in corresponding Chinese Patent Application No. 202180087055.9 (with English Translation and English Translation of Category of Cited Documents), 21 pages.

* cited by examiner

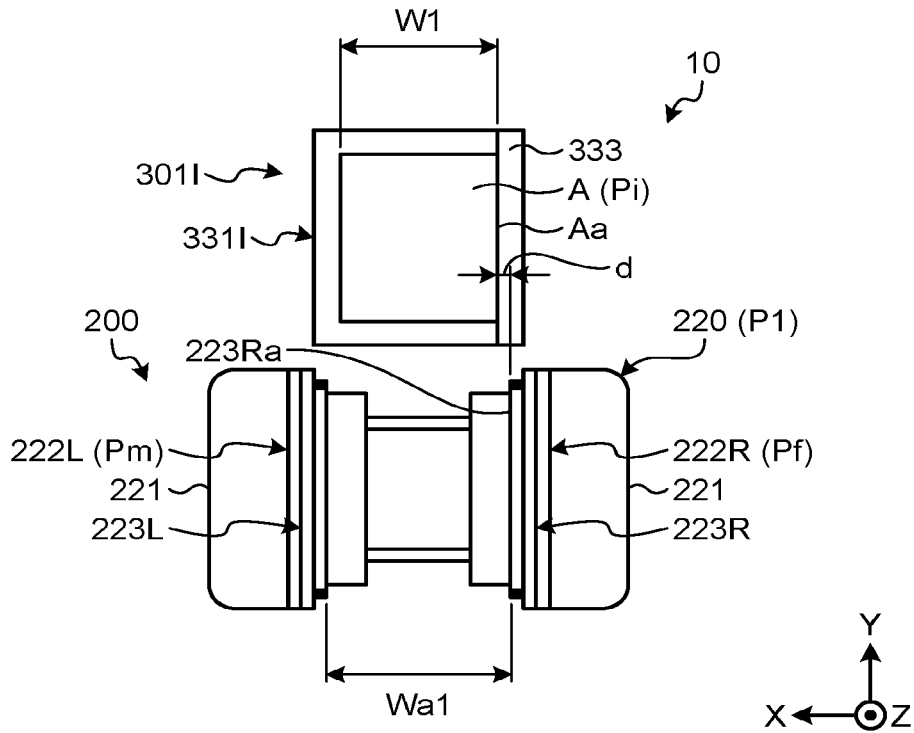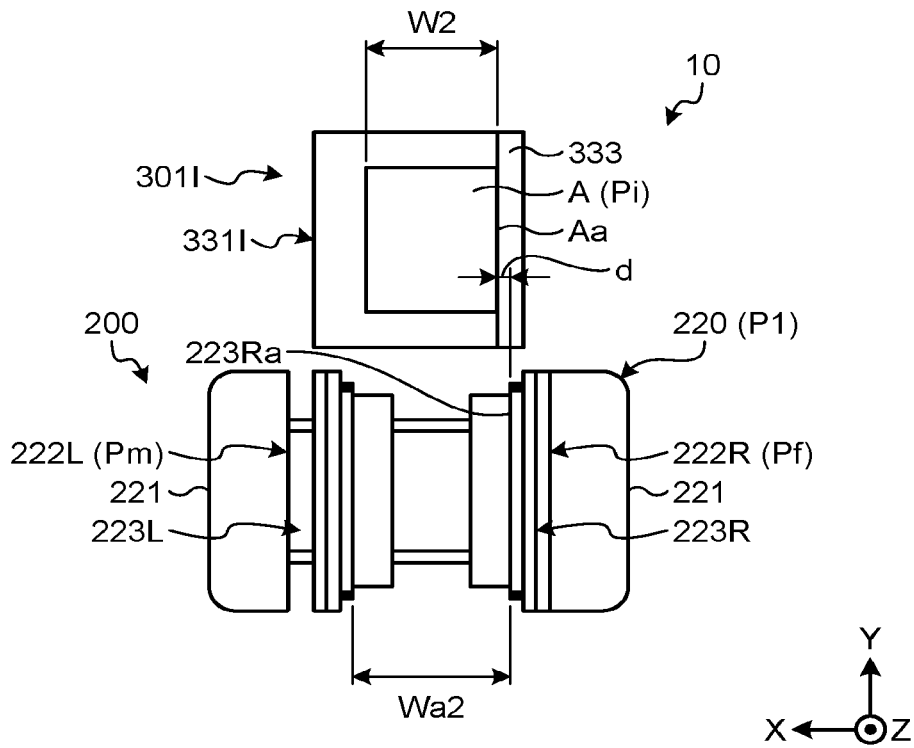

AUTOMATED WAREHOUSE

FIELD

The present invention relates to an automated warehouse.

BACKGROUND

Conventionally, there has been known an article transport device that includes a pair of extendable arms and transfers an article located between the pair of extendable arms between an extended position and a retracted position of the extendable arms (for example, Patent Literature 1). Furthermore, the article transport device described in Patent Literature 1 is configured to be able to change the interval of the pair of extendable arms depending on the size of article so as to be able to handle articles of various sizes.

CITATION LIST

Patent Literature

Patent Literature 1: JP 6428367 B

SUMMARY

Technical Problem

Regarding an automated warehouse including this type of article transport device, it is beneficial to obtain an automated warehouse having a novel configuration with further improvement capable of facilitating transfer of articles of various sizes by the article transport device.

In view of this, an object of the present invention is to provide an automated warehouse having a novel configuration with further improvement capable of facilitating transfer of articles, for example.

Solution to Problem

To solve the problem and achieve the object, an automated warehouse according to the present invention includes: a storage shelf in which a plurality of storage positions is set, the storage positions facing a transport path extending in a first direction; a mobile body including a base and capable of transporting an article, the mobile body being provided on the transport path so as to be movable among a first transfer position, a second transfer position, and a plurality of third transfer positions, the first transfer position being a position at which the article is transferred to or from a first transport mechanism, being aligned in a second direction intersecting the first direction with respect to the first transport mechanism, and located at an end of the transport path in the first direction, the second transfer position being a position at which the article is transferred to or from a second transport mechanism, being aligned in the second direction with respect to the second transport mechanism, and being located at an end of the transport path in a direction opposite to the first direction, and each of the plurality of third transfer positions being a position at which the article is transferred to or from each of the storage positions; a first arm supported by the base so as to be able to change a support position in the first direction, and extending in the second direction; a second arm supported by the base so as to be able to change the support position in the first direction, and extending in the second direction spaced apart from the first arm in the direction opposite to the first direction; and a movable portion that is provided to be relatively movable in the second direction with respect to the base and that is capable of moving the article, in a state where the article is located between the first arm and the second arm, in the second direction and in a direction opposite to the second direction, the movable portion being capable of causing the article to move between the mobile body and the first transport mechanism in a state where the mobile body is located at the first transfer position, and capable of causing the article to move between the mobile body and the second transport mechanism in a state where the mobile body is located at the second transfer position, wherein the support positions of the first arm and the second arm supported by the base in the first direction are changeable, and in a state where the mobile body is located at the first transfer position, the support position of the second arm supported by the base is fixed and the support position of the first arm supported by the base is changed depending on a length of the article in the first direction, and, alternatively, in a state where the mobile body is located at the second transfer position, the support position of the first arm supported by the base is fixed and the support position of the second arm supported by the base is changed depending on the length of the article in the first direction.

BRIEF DESCRIPTION OF DRAWINGS

FIG. 6 is an exemplary and schematic plan view of a part of the automated warehouse of the first embodiment, and is a view illustrating a state before an article having a relatively large size is loaded from a loading mechanism.

FIG. 7 is an exemplary and schematic plan view of a part of the automated warehouse of the first embodiment, and is a view illustrating a state before an article having a size smaller than a size in the case of FIG. 6 is loaded from the loading mechanism.

DESCRIPTION OF EMBODIMENTS

Hereinafter, exemplary embodiments of the present invention are disclosed. The configurations of the embodiments described below and the actions and results (effects) obtained from the configurations are described as one example. The present invention can also be implemented by configurations other than those disclosed in the following embodiments. In addition, according to the present invention, it is possible to obtain at least one of various effects (including derivative effects) obtained by the following configurations.

In the present specification, ordinal numbers are given for convenience to distinguish directions, positions, distances, members, parts, sites, and the like, and do not indicate priorities or orders.

In each drawing, each direction in an automated warehouse is indicated by an arrow. The X direction, the Y direction, and the Z direction intersect each other and are orthogonal to each other. The Z direction is substantially set along the vertical direction, and the arrow Z points vertically upward. The Z direction may also be referred to as a vertical direction. The X direction and the Y direction are substantially set along the horizontal direction.

In addition, in each drawing, a reference sign indicating a position may be depicted in parentheses in association with a reference sign of a part or a site.

First Embodiment

[Outline of Automated Warehouse]

Figure 1:
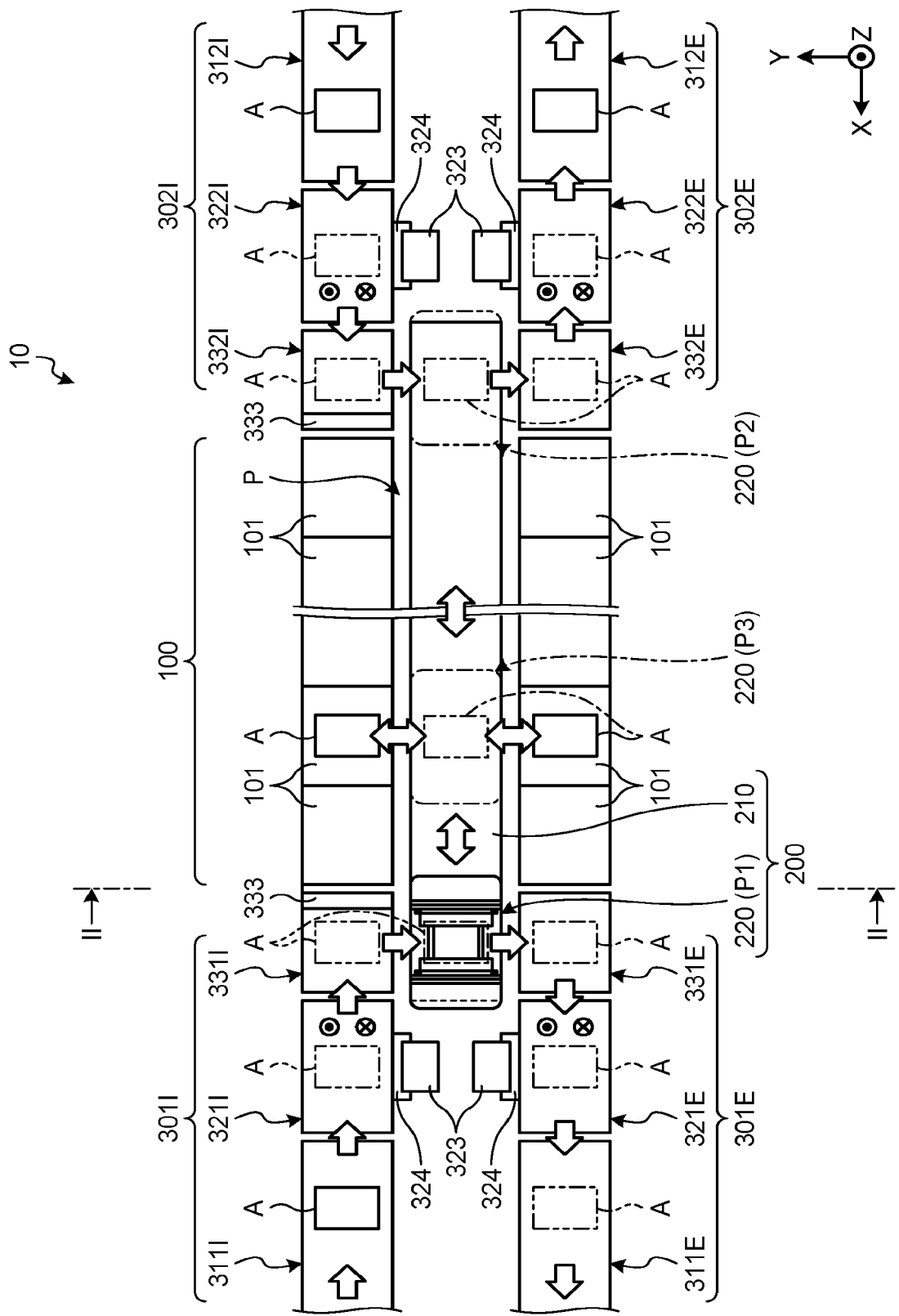
FIG. 1 is an exemplary and schematic plan view of an automated warehouse according to an embodiment.

FIG. 1 is a plan view of an automated warehouse 10 according to a first embodiment. As illustrated in FIG. 1, the automated warehouse 10 includes a storage shelf 100, a transport mechanism 200, loading mechanisms 301I and 302I, and unloading mechanisms 301E and 302E.

The storage shelf 100 can store a plurality of articles A. The article A has a box shape, for example. The automated warehouse 10 can handle a plurality of types of articles A having different sizes. The article A is not limited to a box, and may be a container or the like.

The transport mechanism 200 transports the article A on a transport path P in the automated warehouse 10. The loading mechanisms 301I and 302I transport the article A from the outside of the automated warehouse 10 to the automated warehouse 10. In addition, the unloading mechanisms 301E and 302E transport the article A from the automated warehouse 10 to the outside of the automated warehouse 10.

The transport path P extends to substantially run along the X direction. On the storage shelf 100, a plurality of storage sections 101 facing the transport path P is aligned in the X direction. The rows of the plurality of storage sections 101 extending in the X direction are adjacent to both sides of the transport path P in the Y direction. In other words, the transport path P is sandwiched between two rows of the plurality of storage sections 101 extending in the X direction. The storage sections 101 need not be partitioned. In the present embodiment, as an example, the storage position of the article A in each storage section 101 is only one position. However, the present invention is not limited thereto and a plurality of storage positions may be set in the Y direction in each storage section 101, for example. The X direction is an example of a first direction, and the Y direction is an example of a second direction. The storage section 101 is an example of a storage position of the article A.

In the present embodiment, the transport mechanism 200 is configured as a mobile carriage system as an example. The transport mechanism 200 includes: a rail 210 extending in the X direction; and a carriage 220 movable on the rail 210 in the X direction and a direction opposite to the X direction. The carriage 220 is an example of a mobile body.

The carriage 220 can move in the X direction and the direction opposite to the X direction along the rail 210 while supporting the article A. That is, the carriage 220 can transport the article A in the X direction and the direction opposite to the X direction. In addition, the carriage 220 can move between a position P1 at an end in the X direction on the transport path P, a position P2 at an end in the direction opposite to the X direction on the transport path P, and a position P3 aligned with each storage section 101 in the Y direction, and can also stop at each of the positions P1, P2, and P3.

The position P1 is a position of the carriage 220 when the article A is transferred between the loading mechanism 301I or the unloading mechanism 301E and the carriage 220, and is a position at an end or near the end of the transport path P in the X direction. In a state where the carriage 220 is at the position P1, a part of the loading mechanism 301I, the carriage 220, and a part of the unloading mechanism 301E are aligned in the Y direction. The position P1 may be either a position determined under the control of a controller 400 (refer to FIG. 4) or a position mechanically determined by a stopper or the like. The position P1 does not need to be a limit position in the X direction on the transport path P. The carriage 220 may be configured to be movable beyond the position P1 in the X direction on the rail 210. The position P1 is an example of a first transfer position, and the loading mechanism 301I is an example of a first transport mechanism. The Y direction is an example of the second direction.

The position P2 is a position of the carriage 220 when the article A is transferred between the loading mechanism 302I or the unloading mechanism 302E and the carriage 220, and is a position at an opposite end or near the end of the transport path P in the X direction. In a state where the carriage 220 is at the position P2, a part of the loading mechanism 302I, the carriage 220, and a part of the unloading mechanism 302E are aligned in the Y direction. The position P2 may be a position determined under the control of the controller 400 or a position mechanically determined by a stopper or the like. The position P2 does not need to be a limit position in the direction opposite to the X direction on the transport path P. The carriage 220 may be configured to be movable beyond the position P2 in the direction opposite to the X direction on the rail 210. The position P2 is an example of a second transfer position, and the loading mechanism 302I is an example of a second transport mechanism.

The position P3 is a position of the carriage 220 when the article A is transferred between each storage section 101 and the carriage 220. In a state where the carriage 220 is at the position P3, the storage section 101 and the carriage 220 are aligned in the Y direction. Since the storage shelf 100 has the plurality of storage sections 101 having different positions at least in the X direction, the position P3 corresponding to the individual storage section 101 is supposed to exist in plurality on the transport path P. The position P3 is determined under the control of the controller 400. The position P3 is an example of a third transfer position.

In addition, the carriage 220 has a transfer mechanism (not illustrated in FIG. 1) that moves the article A in the Y direction or a direction opposite to the Y direction between the carriage 220 and the outside of the carriage 220. The transfer mechanism can move the article A between the carriage 220 and either the loading mechanism 301I or the unloading mechanism 301E at the position P1, can move the article A between the carriage 220 and either the loading mechanism 302I or the unloading mechanism 302E at the position P2, and can move the article A between the carriage 220 and the storage section 101 at the position P3. The transfer mechanism will be described below. The carriage 220 may also be referred to as a transfer device.

Figure 2:
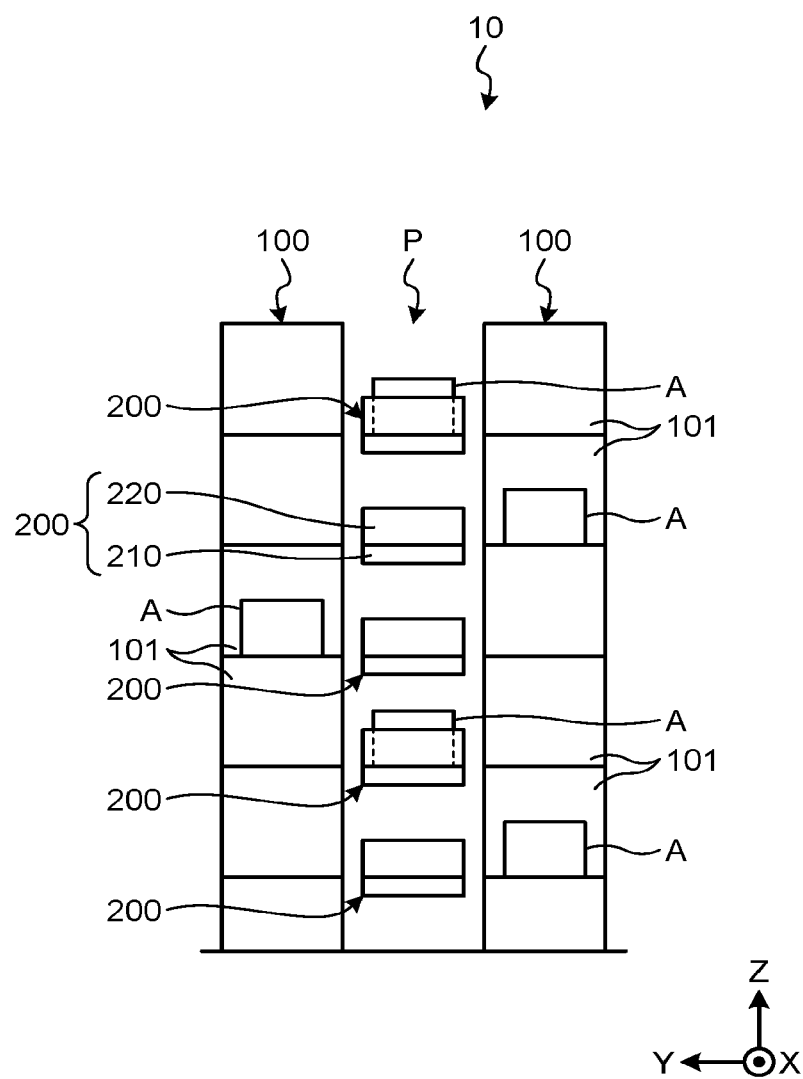
FIG. 2 is a side view taken along line II-II in FIG. 1.

FIG. 2 is a side view taken along line II-II in FIG. 1. As illustrated in FIG. 2, the storage shelf 100 has a plurality of stages of storage sections 101 in the Z direction on both sides across the transport path P in the Y direction. At each stage in the Z direction of the storage shelf 100, the plurality of storage sections 101 is aligned in the X direction on both sides of the transport path P in the Y direction as illustrated in FIG. 1.

In the transport path P, the transport mechanism 200 is provided corresponding to each stage (each floor) in the Z direction in which the storage sections 101 are aligned in the X direction. The transport mechanisms 200 can each operate independently. In the transport path P, rails 210 extending in the X direction are aligned in the Z direction at predetermined intervals, for example, at constant intervals. Each rail 210 supports the carriage 220 so as to be movable on the rail 210 in the X direction and the direction opposite to the X direction. The transport mechanism 200 can transfer the article A to and from the storage sections 101 on both sides in the Y direction. The Z direction may also be referred to as a third direction.

Figure 3:
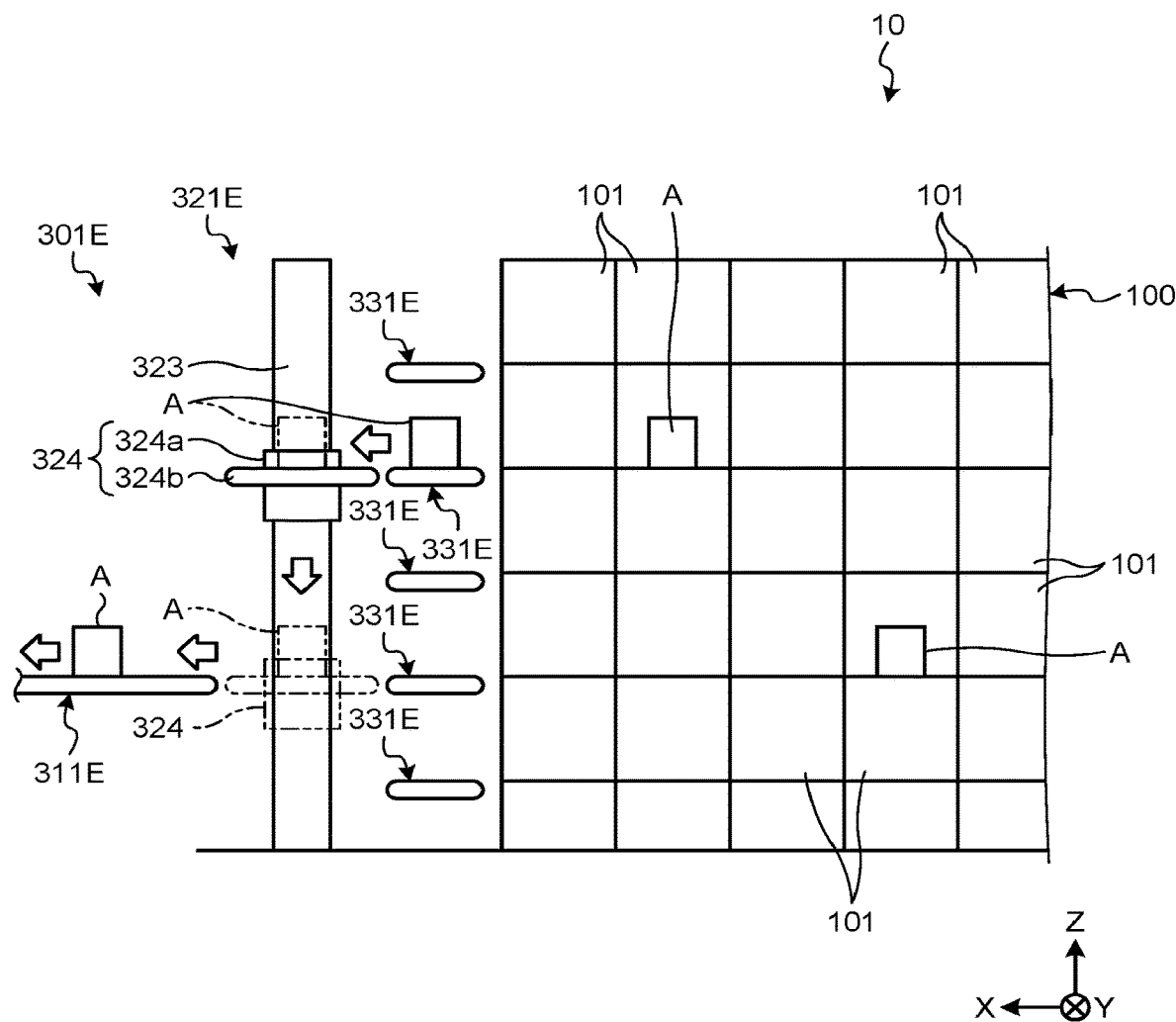
FIG. 3 is an exemplary and schematic side view of a part of the automated warehouse of the embodiment.

FIG. 3 is a side view of a part of the automated warehouse 10. As illustrated in FIG. 3, the plurality of storage sections 101 is arranged in a matrix in the X direction and the Z direction in the storage shelf 100. Although FIG. 3 illustrates the plurality of storage sections 101 adjacent to the transport path P (not illustrated in FIG. 3, refer to FIGS. 1 and 2) in the direction opposite to the Y direction, the plurality of storage sections 101 adjacent to the transport path P in the Y direction is also aligned in a matrix in the X direction and the Z direction as illustrated in FIG. 3.

As illustrated in FIG. 3, the unloading mechanism 301E includes a transport conveyor 311E, a lifter 321E, and a plurality of relay conveyors 331E. The relay conveyor 331E is provided corresponding to each stage of the transport mechanism 200 and the storage section 101.

In the present embodiment, only one transport conveyor 311E is provided. However, the present invention is not limited thereto, and the unloading mechanism 301E may include a plurality of the transport conveyors 311E.

The lifter 321E includes: a mast 323 as a rail extending in the Z direction; and an elevating body 324 movable in the Z direction and a direction opposite to the Z direction along the mast 323. The elevating body 324 includes: a movable base 324a supported by the mast 323 so as to be movable in the Z direction and the direction opposite to the Z direction; and a conveyor 324b attached to the movable base 324a.

The movable base 324a can stop at a position where the conveyor 324b is aligned with each relay conveyor 331E in the X direction and a position where the conveyor 324b is aligned with the transport conveyor 311E in the X direction.

At a position where the conveyor 324b and each relay conveyor 331E are aligned in the X direction, the conveyor 324b and the relay conveyor 331E cooperate with each other to move the article A from the relay conveyor 331E to the conveyor 324b. At a position where the conveyor 324b and the transport conveyor 311E are aligned in the X direction, the conveyor 324b and the transport conveyor 311E cooperate with each other to move the article A from the conveyor 324b to the transport conveyor 311E.

Between the relay conveyor 331E and the transport mechanism 200 of each stage, the transfer mechanism of the carriage 220 moves the article A in the Y direction or the direction opposite to the Y direction.

In this manner, the unloading mechanism 301E can move the article A moved from the transport mechanism 200 of each stage to the corresponding relay conveyor 331E further to the transport conveyor 311E via the relay conveyor 331E and the lifter 321E.

The unloading mechanism 302E and the loading mechanisms 301I and 302I illustrated in FIG. 1 each have the components similar to the unloading mechanism 301E. However, the transport direction of the article A in each component is different from the direction in the unloading mechanism 301E.

As illustrated in FIG. 1, the unloading mechanism 302E includes a transport conveyor 312E similar to the transport conveyor 311E, a lifter 322E similar to the lifter 321E, and a relay conveyor 332E similar to the relay conveyor 331E. The unloading mechanism 302E can move the article A moved from the transport mechanism 200 of each stage to the corresponding relay conveyor 332E further to the transport conveyor 312E via the lifter 322E.

The loading mechanism 301I includes a transport conveyor 311I similar to the transport conveyor 311E, a lifter 321I similar to the lifter 321E, and a relay conveyor 331I similar to the relay conveyor 331E. The loading mechanism 301I can move the article A to the relay conveyor 331I of each stage via the transport conveyor 311I and the lifter 321I. The article A moved to the relay conveyor 331I is transported to a predetermined storage section 101 by a transport mechanism 200 corresponding to the relay conveyor 331I.

In addition, the loading mechanism 302I includes a transport conveyor 312I similar to the transport conveyor 311E, a lifter 322I similar to the lifter 321E, and a relay conveyor 332I similar to the relay conveyor 331E. The loading mechanism 302I can move the article A to the relay conveyor 332I of each stage via the transport conveyor 312I and the lifter 322I. The article A moved to the relay conveyor 331I is transported to a predetermined storage section 101 by a transport mechanism 200 corresponding to the relay conveyor 331I.

[Control System of Automated Warehouse]

Figure 4:
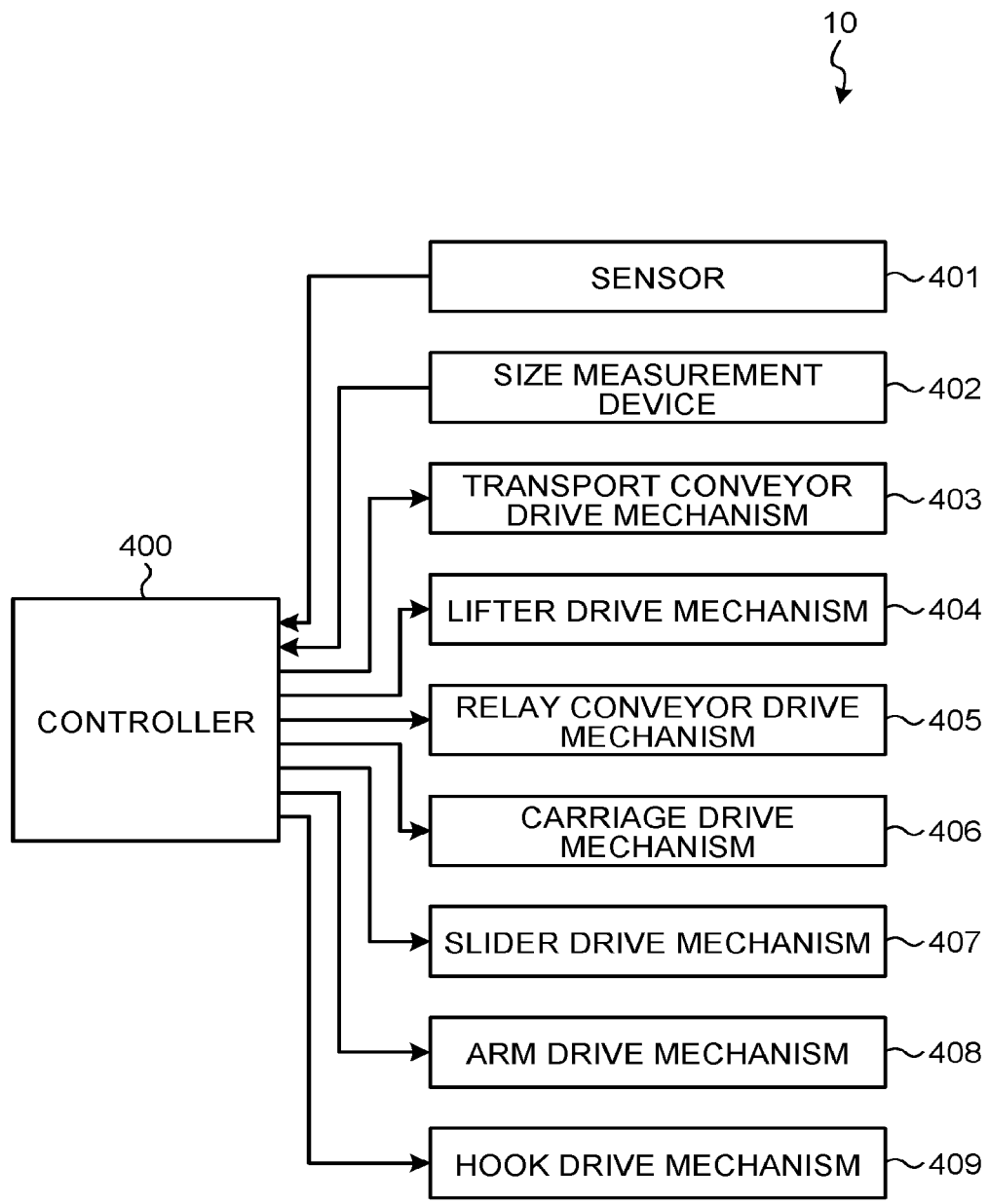
FIG. 4 is an exemplary block diagram of the automated warehouse according to the embodiment.

FIG. 4 is a block diagram related to electrical control of the automated warehouse 10. The automated warehouse 10 includes a controller 400, a sensor 401, a size measurement device 402, a transport conveyor drive mechanism 403, a lifter drive mechanism 404, a relay conveyor drive mechanism 405, a carriage drive mechanism 406, a slider drive mechanism 407, an arm drive mechanism 408, and a hook drive mechanism 409.

The sensor 401 is a sensor that detects each position of the article A and each movable element of the automated warehouse 10. The size measurement device 402 measures the size of the article A transported to the automated warehouse 10 by the loading mechanisms 301I and 302I. As an example, the size measurement device 402 includes a photoelectric sensor that measures the size of the article A transported by the transport conveyors 311I and 312I of the loading mechanisms 301I and 302I. In this case, for example, the controller 400 can measure the length of the article A in the transport direction as a multiplication value of time and a transport speed, specifically, the time when the sensor light is blocked by the article A in the photoelectric sensor and the transport speed of the article A. The measurement method of the size measurement device 402 and the method of calculating the size of the article A by the controller 400 are not limited to this example.

The transport conveyor drive mechanism 403 is an actuator that actuates the transport conveyors 311I, 312I, 311E, and 312E. The lifter drive mechanism 404 is an actuator that actuates the lifters 321I, 322I, 321E, and 322E. The relay conveyor drive mechanism 405 is an actuator that actuates the relay conveyors 331I, 332I, 331E, and 332E. The carriage drive mechanism 406 is an actuator that actuates the carriage 220. The slider drive mechanism 407 is an actuator that drives sliders 222L and 222R (refer to FIG. 5) provided on the carriage 220. The arm drive mechanism 408 is an actuator that drives arms 223L and 223R (refer to FIG. 5) provided on the carriage 220. The hook drive mechanism 409 is an actuator that drives a hook 224 (refer to FIG. 5) provided on the carriage 220. The actuator is a device that operates on the basis of an electric signal (control signal) output from the controller 400, and includes a motor, for example.

Based on information acquired from an external device, detection signals by the sensor 401 and the size measurement device 402, and the like, the controller 400 controls each of the drive mechanisms 403 to 409 so as to achieve execution of predetermined operations of the transport conveyors 311I, 312I, 311E, and 312E, the lifters 321I, 322I, 321E, and 322E, the relay conveyors 331I, 332I, 331E, and 332E, the carriage 220, the sliders 222L and 222R, the arms 223L and 223R, and hooks 224 and 225.

[Configuration of Carriage]

Figure 5:
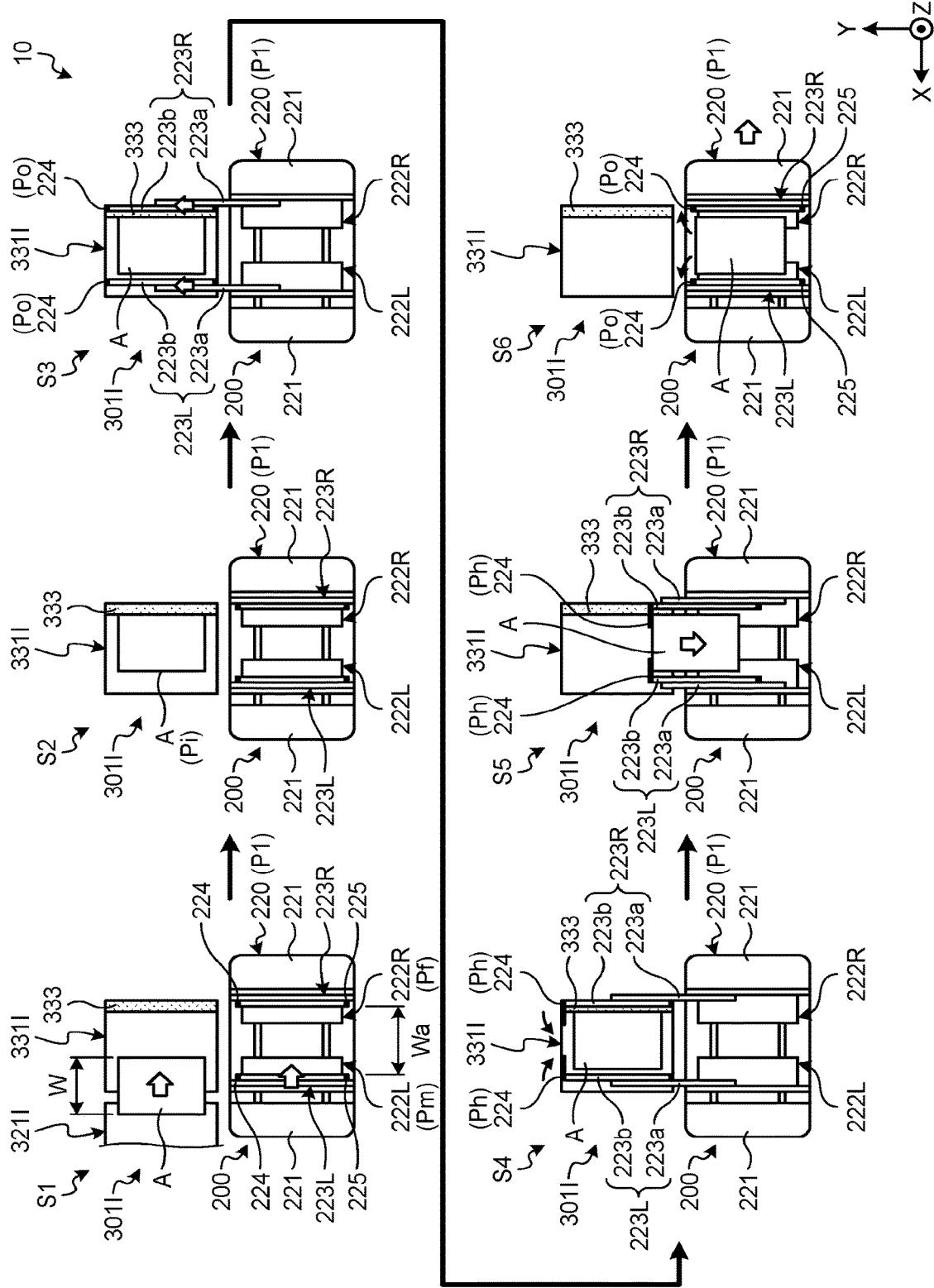
FIG. 5 is an exemplary schematic plan view illustrating a procedure of loading an article at one end in a longitudinal direction of a transport path of the automated warehouse of a first embodiment.

FIG. 5 is a plan view illustrating a procedure of transfer of the article A from the loading mechanism 301I to the carriage 220 of the transport mechanism 200 at the end of the transport path P in the X direction.

As illustrated in FIG. 5, the carriage 220 includes a base 221, sliders 222L and 222R, arms 223L and 223R, and hooks 224 and 225. The sliders 222L and 222R, the arms 223L and 223R, and the hooks 224 and 225 constitute a transfer mechanism that moves the article A in the Y direction or the direction opposite to the Y direction between the carriage 220 and the outside of the carriage 220.

The base 221 is configured to be movable at least in the X direction and a direction opposite to the X direction on the transport path P, and is configured to be able to change a stop position at least in the X direction. The position of the carriage 220 is determined by the position of the base 221 on the rail 210. The controller 400 can control the carriage drive mechanism 406 to change the position of the base 221, that is, the carriage 220 on the rail 210.

The sliders 222L and 222R are supported by the base 221 so as to be changeable in position in the X direction. The slider 222L supports the arm 223L, and the slider 222R supports the arm 223R. The arm 223R is separated from the arm 223L in the direction opposite to the X direction. The arm 223L is an example of a first arm, and the arm 223R is an example of a second arm.

The carriage 220 includes a slider drive mechanism 407 corresponding to each of the sliders 222L and 222R. By controlling each of the slider drive mechanisms 407, the controller 400 can individually change the relative positions of the sliders 222L and 222R with respect to the base 221 in the X direction, that is, the relative positions of the arms 223L and 223R with respect to the base 221 in the X direction.

The arms 223L and 223R each extend in the Y direction. In addition, the arms 223L and 223R are extendable in the Y direction and the direction opposite to the Y direction.

The hook 224 is provided at the end of each of the arms 223L and 223R in the Y direction, and the hook 225 is provided at the end of each of the arms 223L and 223R in the direction opposite to the Y direction. That is, the hook 225 is separated from the hook 224 in the direction opposite to the Y direction.

[Movement of Article from Loading Mechanism to Carriage]

In steps S1 to S6, the carriage 220 is located at a position P1 aligned with the relay conveyor 331I in the Y direction.

In step S1, the controller 400 controls the lifter drive mechanism 404 and the relay conveyor drive mechanism 405 so that the article A from the lifter 321I moves in the direction opposite to the X direction by the relay conveyor 331I. In addition, the controller 400 controls the relay conveyor drive mechanism 405 so that the article A reaches a pre-loading position Pi in step S2.

The size measurement device 402 measures a length W of the article A in the X direction at a measurement location (not illustrated) before the article A reaches the pre-loading position Pi in step S2.

In steps S4 to S6 of transferring the article A from the loading mechanism 301I to the transport mechanism 200, the arm 223L is disposed to be slightly separated from the article A in the X direction, while the arm 223R is disposed to be in contact with or slightly separated from the article A in the direction opposite to the X direction. In other words, the two arms 223L and 223R are disposed to set the article A to be located between the two arms 223L and 223R with a slight gap in the X direction.

Figure 8:
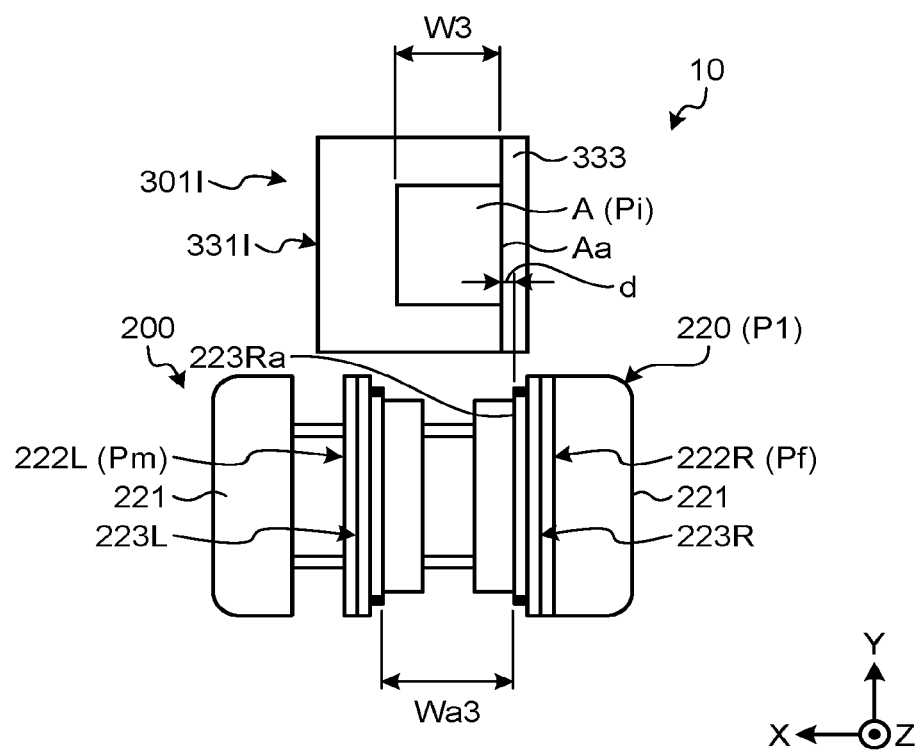
FIG. 8 is an exemplary and schematic plan view of a part of the automated warehouse of the first embodiment, and is a view illustrating a state before an article having a size smaller than that in the case of FIG. 7 is loaded from the loading mechanism.

FIGS. 6 to 8 are plan views of the loading mechanism 301I and the transport mechanism 200 (carriage 220) when the article A has different lengths W1 to W3 in the X direction. Here, the length W1 (FIG. 6) is longer than the length W2 (FIG. 7), and the length W2 is longer than the length W3 (FIG. 8).

In the present embodiment, in order to achieve appropriate arrangement of the two arms 223L and 223R in steps S3 to S6 and the article A in the X direction corresponding to individual cases where the lengths W1 to W2 of the article A in the X direction are different as illustrated in FIGS. 6 to 8, the controller 400 controls individual portions in step S1 as follows. That is, the controller 400 fixes a position P1 of the base 221 in the X direction with respect to the rail 210, fixes a position Pf of the slider 222R, that is, the arm 223R in the X direction with respect to the base 221, and changes a position Pm of the slider 222L, that is, the arm 223L in the X direction, with respect to the base 221. The position Pf may also be referred to as a fixed position, and the position Pm may also be referred to as a variable set position.

The article A is transported in the direction opposite to the X direction by the relay conveyor 331I, and stops at the pre-loading position Pi by abutting on a stopper 333, or the like. In this case, the position of an end Aa of the article A in the direction opposite to the X direction is constant regardless of a dimension W of the article A in the X direction. Therefore, in the present embodiment, as illustrated in FIGS. 6 to 8, the controller 400 sets the position of the end Aa of the article A at the pre-loading position Pi (that is, the position of the stopper 333) and the position P1 of the carriage 220 such that the end 223Ra in the X direction of the arm 223R, which is located in the direction opposite to the X direction among the two arms 223L and 223R, is shifted in the direction opposite to the X direction by a distance d (>0) slightly from the end Aa of the article A located at the pre-loading position Pi.

With this setting, in the present embodiment, the controller 400 is only required, in step S1 of FIG. 5, to appropriately change the relative position Pm in the X direction of the slider 222L (arm 223L) with respect to the base 221 depending on the length W (W1 to W3) in the X direction of the article A depending on the length W. That is, the controller 400 does not need to change the relative position P1 of the base 221 in the X direction with respect to the rail 210 or the relative position Pf of the slider 222R (arm 223R) in the X direction with respect to the base 221. That is, according to the present embodiment, in the loading of the article A from the loading mechanism 301I to the carriage 220 at the position P1, it is possible to further simplify the control of changing the positions of the carriage 220 and the arms 223L and 223R in the X direction corresponding to the size of the article A. The pre-loading position Pi in FIGS. 5 to 8 are an example of a predetermined position where the end Aa on the opposite side in the X direction of the article A is positioned. The pre-loading position Pi may be a position determined under the control of the controller 400.

In addition, the controller 400 controls the slider drive mechanism 407 corresponding to the slider 222L so as to set a distance Wa (Wa1 to Wa3) in the X direction of the two arms 223L and 223R to be longer than the length W (W1 to W3) in the X direction of the article A, and changes the relative position of the arm 223L, that is, the slider 222L in the X direction, with respect to the base 221. That is, in each case of FIGS. 6 to 8, the controller 400 sets the arm 223L, in step S1 of FIG. 5, to be at a position Pm separated from the arm 223R in the X direction by the distances Wa1 to Wa2 equal to or more than the lengths W1 to W3 of the article A in the X direction, respectively. The distance Wa (Wa1 to Wa3) is an example of the first distance. The length W of the article A is not limited to the length measured by the size measurement device 402, and may be a value such as a value obtained from an article database corresponding to identification information of the article A. The distance Wa (Wa1 to Wa3) may also be referred to as an interval.

The distance Wa in the X direction between the arms 223L and 223R may be set in a plurality of stages. As an example, the controller 400 may set the distance Wa, which is a distance between the two arms 223L and 223R according to the length W of the article A, to the distance Wa1 in a case of $Wt0 \leq w \leq Wt1$, the distance Wa2 in a case of $Wt1 \leq W \leq Wt2$, and the distance Wa3 in a case of $Wt2 \leq w \leq Wt3$. Here, Wt0, Wt1, Wt2, and Wt3 are thresholds of the length W. With such a setting, for example, it is possible to facilitate the control of the relative position in the X direction of the arm 223L, that is, the slider 222L with respect to the base 221 by the controller 400 and simplify the configuration for making the distance Wa variable.

In addition, the controller 400 may set the distance Wa in the X direction between the arms 223L and 223R during the movement of the carriage 220 toward the position P1. This enables the article A to be loaded more quickly.

Here, steps S1 to S6 will be described with reference to FIG. 5. With the position Pm of the slider 222L, that is, the arm 223L controlled as described above in step S1, the two arms 223L and 223R are already arranged at appropriate positions corresponding to the pre-loading position Pi and the length W of the article A in the X direction at a time point where the article A reaches the pre-loading position Pi in step S2.

In step S3, the controller 400 controls the arm drive mechanism 408 so that the arms 223L and 223R extend in the Y direction. In the present embodiment, as an example, the arms 223L and 223R are known extendable arms having split arms 223a and 223b extending in the Y direction. The split arm 223a is supported slidably in the Y direction and the direction opposite to the Y direction with respect to the sliders 222L and 222R, while the split arm 223b is supported slidably in the Y direction and the direction opposite to the Y direction with respect to the split arm 223a. In step S3, the two arms 223L and 223R extending in the Y direction are disposed on both sides of the article A in the X direction.

At each position of the carriage 220, the hook 224 is used to move the article A in the direction opposite to the Y direction. In the arms 223L and 223R extended in step S3, the hook 224 is provided, for example, at the end in the Y direction of the split arm 223b so as to be separated in the Y direction from the end in the Y direction of the article A. The hook 224 is, for example, a rod-shaped member extending in the Z direction and is supported rotatably about a rotation axis in the Y direction. The controller 400 controls the hook drive mechanism 409 so as to allow the two hooks 224 to rotate about the rotation axis between a disengagement position Po (disengagement posture) extending in the Z direction and an engagement position Ph (engagement posture) extending in a direction approaching each other in the X direction. The hook 224 is configured not to overlap the article A in the Y direction at the disengagement position Po and to overlap the article A in the Y direction at the engagement position Ph. In step S3, the hook 224 is located at the disengagement position Po. Therefore, the hook 224 and the article A do not interfere with each other when the arms 223L and 223R extend.

In step S4, the controller 400 controls the hook drive mechanism 409 so as to allow the hook 224 to move from the disengagement position Po to the engagement position Ph.

In step S5, the controller 400 retracts the arms 223L and 223R in a state where the hook 224 is located at the engagement position Ph. With this operation, the hook 224 moves in the direction opposite to the Y direction while being located at the engagement position Ph, and presses the article A in the direction opposite to the Y direction. The pressed article A moves in the direction opposite to the Y direction toward the carriage 220 and is placed on the base 221. The hook 224 is also used when moving the article A in the direction opposite to the Y direction at a position other than the position P1 of the carriage 220.

In step S6, the controller 400 controls the hook drive mechanism 409 to set the hook 224 to be located at the disengagement position Po. This completes the loading of the article A from the loading mechanism 301I (relay conveyor 331I) to the transport mechanism 200 (carriage 220) at the position P1 of the carriage 220.

At each position of the carriage 220, the hook 225 is used to move the article A in the Y direction. The hook 225 also has a similar configuration to the hook 224 and operates similarly to the hook 224. That is, in the arms 223L and 223R extending in the Y direction, the hook 225 is provided at the end of the split arm 223b in the direction opposite to the Y direction so as to be separated from the end of the article A in the direction opposite to the Y direction toward the direction opposite to the Y direction. The hook 225 is, for example, a rod-shaped member extending in the Z direction and is supported rotatably about a rotation axis in the Y direction. The controller 400 controls the hook drive mechanism 409 so as to allow the two hooks 225 to rotate about the rotation axis between a disengagement position extending in the Z direction and an engagement position extending in a direction approaching each other in the X direction. The hook 225 is configured not to overlap the article A in the Y direction at the disengagement position, and overlaps the article A in the Y direction at the engagement position. The hook 225 is used when moving the article A in the Y direction at each position of the carriage 220.

The carriage 220 has a hook drive mechanism 409 corresponding to each of the hooks 224 and 225. The controller 400 can control each of the hook drive mechanisms 409, thereby individually changing the relative position of the hooks 224 and 225 with respect to the base 221. The hooks 224 and 225 are an example of a movable portion.

Figure 9:
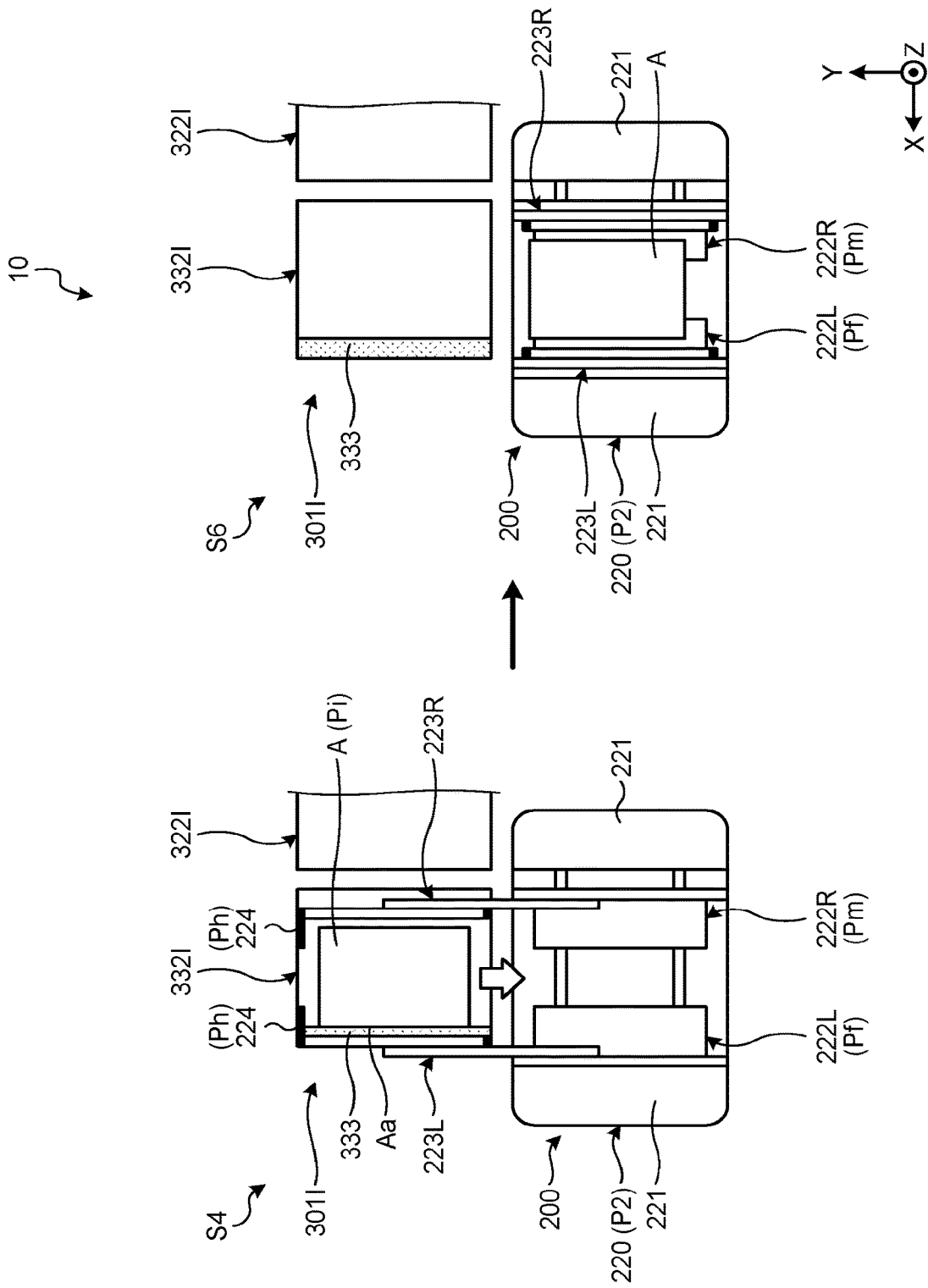
FIG. 9 is an exemplary schematic plan view illustrating a procedure of loading an article at the other end in the longitudinal direction of the transport path of the automated warehouse of the first embodiment.

FIG. 9 is a plan view illustrating a transfer procedure of the article A from the loading mechanism 302I to the carriage 220 of the transport mechanism 200 at the end of the transport path P in the direction opposite to the X direction.

The controller 400 can also perform loading of the article A from the loading mechanism 302I to the carriage 220 at the position P2 by steps S1 to S6 similar to FIG. 5. That is, the article A is supported by the base 221 of the carriage 220 through steps S1 to S3 (not illustrated in FIG. 9), step S4 illustrated in FIG. 9, and step S5 (not illustrated in FIG. 9) and finally as in step S6 illustrated in FIG. 9.

However, in the loading of the article A at the position P2, the controller 400 fixes the position P2 of the base 221 in the X direction with respect to the rail 210, fixes the position Pf of the slider 222L, that is, the arm 223L in the X direction with respect to the base 221, and changes the position Pm of the slider 222R, that is, the arm 223R in the X direction with respect to the base 221. That is, at the position P2, among the two sliders 222L and 222R, the slider to be fixed and the slider to move in the X direction with respect to the base 221 are opposite to those at the position P1. That is, among the two arms 223L and 223R, the arm to be fixed to the base 221 and the arm to move in the X direction are opposite to the case of the position P1.

Also in this case, the controller 400 is only required, in step S1, to appropriately change the relative position Pm and the distance Wa (second distance) in the X direction of the slider 222R (arm 223R) with respect to the base 221 depending on the length W (W1 to W3) in the X direction of the article A depending on the length W. That is, the controller 400 does not need to change the relative position P2 of the base 221 in the X direction with respect to the rail 210 or the relative position Pf of the slider 222L (arm 223L) in the X direction with respect to the base 221. That is, according to the present embodiment, also in the case of loading the article A from the loading mechanism 302I to the carriage 220 at the position P2, similarly to the case of being located at the position P1, it is possible to further simplify the control of changing the positions of the carriage 220 and the arms 223L and 223R in the X direction corresponding to the size of the article A. In addition, also in the loading of the article A at the position P2, the distance Wa in the X direction between the arms 223L and 223R can be set in a plurality of stages. The pre-loading position Pi in FIG. 9 is an example of a predetermined position where the end Aa of the article A in the X direction is positioned.

In addition, the controller 400 may set the distance Wa in the X direction between the arms 223L and 223R during the movement of the carriage 220 toward the position P2. This enables the article A to be loaded more quickly.

As described above, in the automated warehouse 10 of the present embodiment, in a state where the carriage 220 (mobile body) is located at the position P1 (first transfer position) of the end of the transport path P in the X direction (first direction), the position Pf of the arm 223R (second arm) is fixed in the X direction, and the position Pm of the arm 223L (first arm) is changed depending on the length W of the article A in the X direction (first direction). In a state where the carriage 220 is located at the position P2 (second transfer position) of the end of the transport path P in the direction opposite to the X direction, the position Pf of the arm 223L is fixed in the X direction, and the position Pm of the arm 223R is changed depending on the length W of the article A in the X direction.

With such a configuration and control, for example, the number of objects to be controlled by the controller 400 corresponding to the length W of the article A in the X direction can be reduced at both the position P1 and the position P2, leading to achievement of reduction of the load of the arithmetic processing by the controller 400, and achievement of further prompt execution of the positioning of the carriage 220 and the arms 223L and 223R according to the length W of the article A.

In an assumable configuration of the carriage 220 in which the support positions, in the X direction, of the slider 222R and the arm 223R supported by the base 221 are fixed, and only the support positions, in the X direction, of the slider 222L and the arm 223L supported by the base 221 are variably set, loading of the article A to the carriage 220 located at the position P1 from the loading mechanism 301I can be smoothly executed similarly to the present embodiment (refer to FIGS. 5 to 8). This case, however, has an issue regarding the loading of the article A from the loading mechanism 302I to the carriage 220 located at the position P2. Specifically, the arm 223L having variable position in the X direction is located, in the Y direction, opposed to the end Aa (refer to FIG. 9), in the X direction, of the article A having a fixed position in the X direction. Therefore, in order to achieve appropriate arrangement of the arms 223L and 223R corresponding to the length W of the article A in the X direction, there would be a need to adjust the relative position of the carriage 220 in the X direction with respect to the rail 210 in addition to the adjustment of the relative position of the arm 223L in the X direction with respect to the base 221. Similarly to this, in an assumable configuration in which the support positions, in the X direction, of the slider 222L and the arm 223L supported by the base 221 are fixed regardless of the position of the carriage 220, and only the support positions, in the X direction, of the slider 222R and the arm 223R supported by the base 221 are variably set, there would be a need to adjust the relative position of the carriage 220 in the X direction with respect to the rail 210 in loading the article A to the carriage 220 at the position P1 from the loading mechanism 301I. These cases might lead to an increase in the load of the arithmetic processing by the controller 400. In addition, for example, in a case where the carriage 220 is relatively heavy, this would increase the time to align the carriage 220, increase energy consumption for moving the carriage 220, or would need additional equipment for detecting the position of the carriage 220. In this regard, in the present embodiment, as described above, the support position, in the X direction, of the arms supported by the base 221 can be changed for both of the two sliders 222L and 222R, that is, the two arms 223L and 223R, and the slider and the arm fixed in the X direction at the position P1 and the position P2 and the slider and the arm for variably setting the position in the X direction are switched with each other. Consequently, as described above, the movement of the article A from the loading mechanisms 301I and 302I to the carriage 220 can be smoothly executed at both the position P1 and the position P2, with the reduced load of the arithmetic processing by the controller 400.

Furthermore, in the present embodiment, the variable setting of the distance Wa (first distance) in the X direction between the arms 223L and 223R may be performed before the article A reaches the pre-loading position Pi, or may be performed before the carriage 220 reaches the position P1 or the position P2.

With such a configuration and control, for example, the arms 223L and 223R can be disposed at appropriate positions before the movement (loading) of the article A is started, making it possible to further reduce the time required for the loading process regarding the article A.

Second Embodiment

Figure 10:
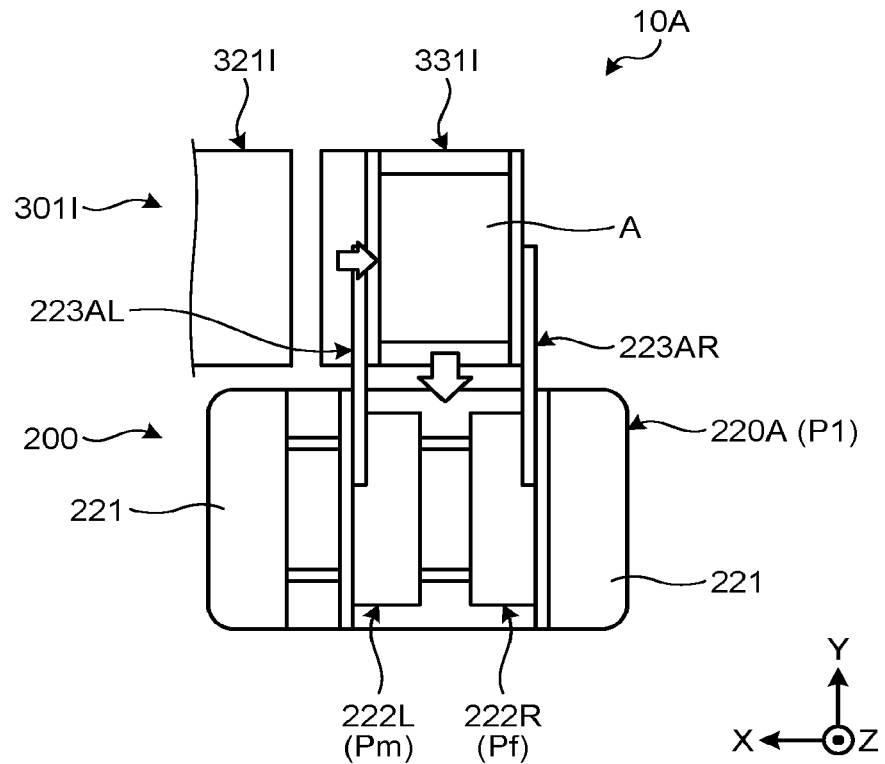
FIG. 10 is an exemplary and schematic plan view of a part of the automated warehouse of a second embodiment.

FIG. 10 is a plan view of a part of an automated warehouse 10A of a second embodiment. In the present embodiment, two arms 223AL and 223AR of a carriage 220A grip the article A in the X direction and move in the Y direction and the direction opposite to the Y direction. In the present embodiment, the two arms 223AL and 223AR function as movable portions. Except for this point, the automated warehouse 10A of the present embodiment has a configuration similar to the automated warehouse 10 of the first embodiment.

Also in the present embodiment, in the movement of the article A from the loading mechanism 301I to the carriage 220A at the position P1, the relative position of the arm 223AR (second arm) in the X direction with respect to the base 221 is fixed, while the relative position of the arm 223AL (first arm) in the X direction with respect to the base 221 is variably set depending on the length of the article A in the X direction. On the other hand, although not illustrated, in the movement of the article A from the loading mechanism 302I to the carriage 220A at the position P2, the relative position of the arm 223AL (first arm) in the X direction with respect to the base 221 is fixed, while the relative position of the arm 223AR (second arm) in the X direction with respect to the base 221 is variably set depending on the length of the article A in the X direction. Consequently, according to the present embodiment, the actions and effects similar to those of the first embodiment can be obtained.

Third Embodiment

Figure 11:
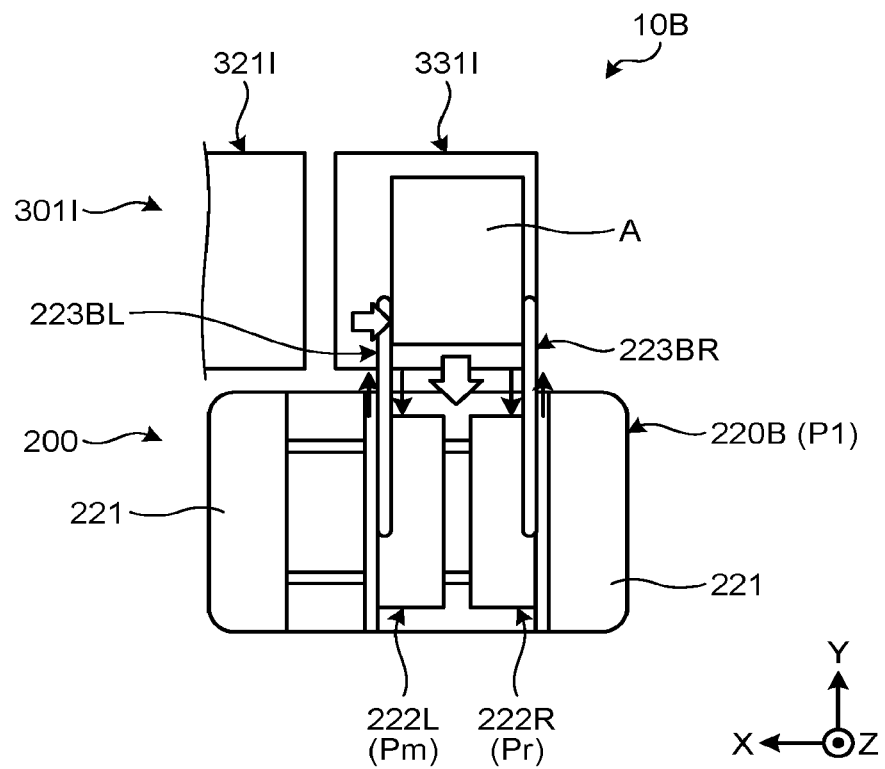
FIG. 11 is an exemplary and schematic plan view of a part of an automated warehouse of a third embodiment.

FIG. 11 is a plan view of a part of an automated warehouse 10B of a third embodiment. In the present embodiment, two arms 223BL and 223BR of a carriage 220B have conveyors that move the article A in the Y direction and the direction opposite to the Y direction. The two arms 223BL and 223BR grip the article A in the X direction and move the article A in the Y direction and the direction opposite to the Y direction by operating the conveyor. In the present embodiment, the two arms 223BL and 223BR function as movable portions. Except for this point, the automated warehouse 10B of the present embodiment has a configuration similar to the automated warehouse 10 of the first embodiment.

Also in the present embodiment, in the movement of the article A from the loading mechanism 301I to the carriage 220B at the position P1, the relative position of the arm 223BR (second arm) in the X direction with respect to the base 221 is fixed, while the relative position of the arm 223BL (first arm) in the X direction with respect to the base 221 is variably set depending on the length of the article A in the X direction. On the other hand, although not illustrated, in the movement of the article A from the loading mechanism 302I to the carriage 220B at the position P2, the relative position of the arm 223BL (first arm) in the X direction with respect to the base 221 is fixed, while the relative position of the arm 223BR (second arm) in the X direction with respect to the base 221 is variably set depending on the length of the article A in the X direction. Consequently, according to the present embodiment, the actions and effects similar to those of the first embodiment can be obtained.

Fourth Embodiment

Figure 12:
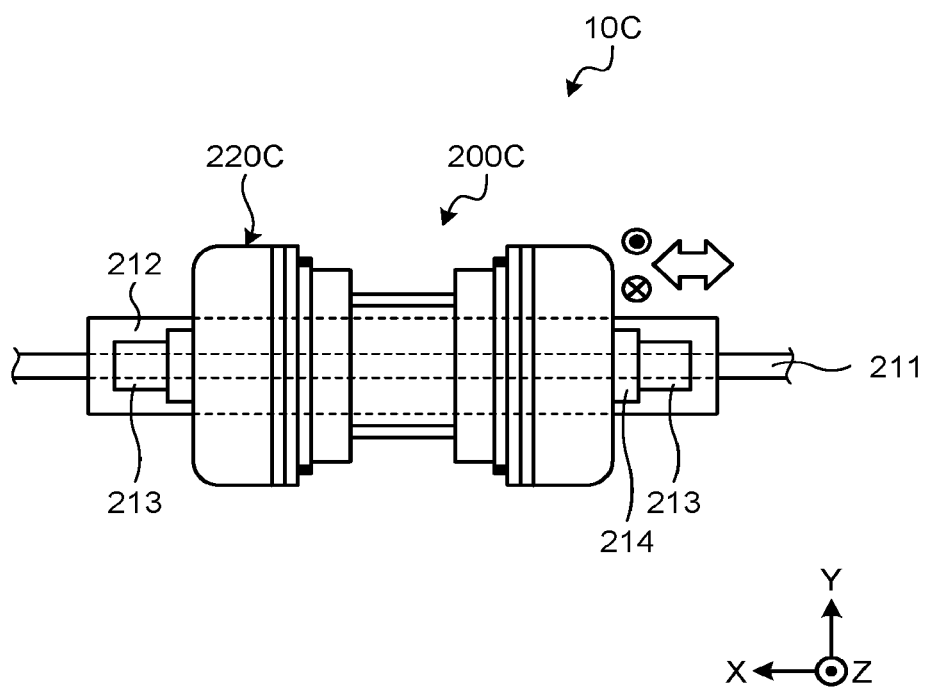
FIG. 12 is an exemplary and schematic plan view of a part of the automated warehouse of a fourth embodiment.

FIG. 12 is a plan view of a part of an automated warehouse 10C of a fourth embodiment. In the present embodiment, a transport mechanism 200C is a stacker crane. Specifically, the transport mechanism 200C includes a rail 211, a base 212, two masts 213, a movable portion 214, and a transfer device 220C. The rail 211 extends in the Y direction on a floor below the transport path P, for example. The two masts 213 are separated from each other in the X direction and extend parallel to each other in the Z direction from the base 212. The movable portion 214 is supported by the two masts 213 so as to be movable in the Z direction and the direction opposite to the Z direction. The transfer device 220C is attached to the movable portion 214 and includes a transfer mechanism similar to the carriage 220 of the first embodiment. The transfer device 220C is an example of a mobile body that is movable, on the transport path P, in the X direction (first direction), the direction opposite to the X direction, the Z direction (third direction), and the direction opposite to the z direction. In this case, the transport mechanism 200C can be provided in place of the plurality of transport mechanisms 200 of the automated warehouse 10 of the first embodiment. In this case, only one transport mechanism 200C is provided on the transport path P.

The automated warehouse 10C of the present embodiment includes a transfer device 220C having a configuration similar to the carriage 220. Consequently, according to the present embodiment, the actions and effects similar to those of the first embodiment can be obtained as well.

Although the embodiments of the present invention have been exemplified as above, the above embodiments are merely examples, and are not intended to limit the scope of the invention. The above-described embodiments can be implemented in various other forms, and various omissions, substitutions, combinations, and alterations can be made without departing from the scope and spirit of the invention. In addition, it is allowable to implement the embodiments with appropriately modified specifications regarding each configuration, shape, and the like (such as structure, type, direction, model, size, length, width, thickness, height, number, arrangement, position, material).

For example, the layout, configuration, and the like of the loading mechanism, the unloading mechanism, the first transfer position, the second transfer position, and the like are not limited to the above embodiment.

REFERENCE SIGNS LIST 10, 10A to 10C AUTOMATED WAREHOUSE
100 STORAGE SHELF
101 STORAGE SECTION (STORAGE POSITION)
200, 200C TRANSPORT MECHANISM
210 RAIL
211 RAIL
212 BASE
213 MAST
214 MOVABLE PORTION
220, 220A, 220B CARRIAGE (MOBILE BODY)
220C TRANSFER DEVICE (MOBILE BODY)

221 BASE
222L, 222R SLIDER
223L ARM (FIRST ARM)
223R ARM (SECOND ARM)
223AL, 223BL ARM (FIRST ARM, AS MOVABLE PORTION)
223AR, 223BR ARM (SECOND ARM, AS MOVABLE PORTION)
223a, 223b SPLIT ARM
223Ra END
224, 225 HOOK (MOVABLE PORTION)
301I, 302I LOADING MECHANISM (FIRST TRANSPORT MECHANISM)
301E, 302E UNLOADING MECHANISM (SECOND TRANSPORT MECHANISM)
311I, 312I, 311E, 312E TRANSPORT CONVEYOR
321I, 322I, 321E, 322E LIFTER
323 MAST
324 ELEVATING BODY
324a MOVABLE BASE
324b CONVEYOR
331I, 332I, 331E, 332E RELAY CONVEYOR
333 STOPPER
400 CONTROLLER
401 SENSOR
402 SIZE MEASUREMENT DEVICE
403 TRANSPORT CONVEYOR DRIVE MECHANISM
404 LIFTER DRIVE MECHANISM
405 RELAY CONVEYOR DRIVE MECHANISM
406 CARRIAGE DRIVE MECHANISM
407 SLIDER DRIVE MECHANISM
408 ARM DRIVE MECHANISM
409 HOOK DRIVE MECHANISM
A ARTICLE
Aa END
d DISTANCE
P TRANSPORT PATH
Pf POSITION
Ph ENGAGEMENT POSITION
Pi PRE-LOADING POSITION (PREDETERMINED POSITION)
Pm POSITION
Po DISENGAGEMENT POSITION
P1 POSITION (FIRST TRANSFER POSITION)
P2 POSITION (SECOND TRANSFER POSITION)
P3 POSITION (THIRD TRANSFER POSITION)
W LENGTH (IN FIRST DIRECTION OF ARTICLE)
Wa DISTANCE (FIRST DISTANCE AND SECOND DISTANCE)
X DIRECTION (FIRST DIRECTION)
Y DIRECTION (SECOND DIRECTION)
Z DIRECTION (THIRD DIRECTION)

The invention claimed is:

1. An automated warehouse comprising:
a storage shelf in which a plurality of storage positions is set, the storage positions facing a transport path extending in a first direction;
a mobile body including a base and capable of transporting an article, the mobile body being provided on the transport path so as to be movable among a first transfer position, a second transfer position, and a plurality of third transfer positions,
the first transfer position
being a position at which the article is transferred to or from a first transport mechanism,
being aligned in a second direction intersecting the first direction with respect to the first transport mechanism, and
located at an end of the transport path in the first direction,
the second transfer position
being a position at which the article is transferred to or from a second transport mechanism,
being aligned in the second direction with respect to the second transport mechanism, and
being located at an end of the transport path in a direction opposite to the first direction, and
each of the plurality of third transfer positions being a position at which the article is transferred to or from each of the storage positions;
a first arm supported by the base so as to be able to change a support position in the first direction, and extending in the second direction;
a second arm supported by the base so as to be able to change the support position in the first direction, and extending in the second direction spaced apart from the first arm in the direction opposite to the first direction; and
a movable portion that is provided to be relatively movable in the second direction with respect to the base and that is capable of moving the article, in a state where the article is located between the first arm and the second arm, in the second direction and in a direction opposite to the second direction, the movable portion being
capable of causing the article to move between the mobile body and the first transport mechanism in a state where the mobile body is located at the first transfer position, and
capable of causing the article to move between the mobile body and the second transport mechanism in a state where the mobile body is located at the second transfer position, wherein
the support positions of the first arm and the second arm supported by the base in the first direction are changeable, and
in a state where the mobile body is located at the first transfer position, the support position of the second arm supported by the base is fixed and the support position of the first arm supported by the base is changed depending on a length of the article in the first direction, and, alternatively, in a state where the mobile body is located at the second transfer position, the support position of the first arm supported by the base is fixed and the support position of the second arm supported by the base is changed depending on the length of the article in the first direction.

2. The automated warehouse according to claim 1, wherein,
when the movable portion moves the article from a pre-loading position on the first transport mechanism to the mobile body located at the first transfer position, the support position of the first arm supported by the base is set to a position separated from the second arm by a first distance, which is equal to or longer than a length of the article in the first direction, before the article reaches the pre-loading position, and
when the movable portion moves the article from a pre-loading position on the second transport mechanism to the mobile body located at the second transfer position, the support position of the second arm supported by the base is set to a position separated from the first arm by a second distance, which is equal to or longer than the length of the article in the first direction, before the article reaches the pre-loading position.

3. The automated warehouse according to claim 2, wherein,
when the movable portion moves the article from the pre-loading position on the first transport mechanism to the mobile body located at the first transfer position, the support position of the first arm supported by the base is set during movement of the mobile body toward the first transfer position, and
when the movable portion moves the article from the pre-loading position on the second transport mechanism to the mobile body located at the second transfer position, the support position of the second arm supported by the base is set during movement of the mobile body toward the second transfer position.

4. The automated warehouse according to claim 3, wherein the first distance and the second distance are changed depending on the length of the article in the first direction.

5. The automated warehouse according to claim 4, wherein the first distance and the second distance are changed in a plurality of predetermined stages depending on the length of the article in the first direction.

6. The automated warehouse according to claim 2, wherein the first distance and the second distance are changed depending on the length of the article in the first direction.

7. The automated warehouse according to claim 6, wherein the first distance and the second distance are changed in a plurality of predetermined stages depending on the length of the article in the first direction.

8. The automated warehouse according to claim 1, wherein
the storage shelf has, as the plurality of storage positions, a plurality of storage positions aligned in the first direction,
the first transfer position, the plurality of third transfer positions, and the second transfer position are aligned in the first direction, and
the mobile body is movable in the first direction and the direction opposite to the first direction.

9. The automated warehouse according to claim 1, wherein
the storage shelf includes, as the plurality of storage positions, a plurality of storage positions having different positions in the first direction and a plurality of storage positions having different positions in a third direction intersecting the first direction and the second direction, and
the mobile body is movable in the first direction, the direction opposite to the first direction, the third direction, and a direction opposite to the third direction.

10. An automated warehouse comprising:
a storage shelf in which a plurality of storage positions is set, the storage positions facing a transport path extending in a first direction;
a mobile body including a base and capable of transporting an article, the mobile body being provided on the transport path so as to be movable among a first transfer position, a second transfer position, and a plurality of third transfer positions,
the first transfer position
being a position at which the article is transferred to or from a first transport mechanism, and
being aligned, in a second direction intersecting the first direction, with the article having an end in a direction opposite to the first direction located at a predetermined position,
the second transfer position
being a position at which the article is transferred to or from a second transport mechanism, and
being aligned, in the second direction, with the article having an end in the first direction located at a predetermined position, and
each of the plurality of third transfer positions being the position at which the article is transferred to or from each of the storage positions;
a first arm supported by the base so as to be able to change a support position in the first direction, and extending in the second direction;
a second arm supported by the base so as to be able to change the support position in the first direction and extending in the second direction spaced apart from the first arm in the direction opposite to the first direction; and
a movable portion that is provided to be relatively movable in the second direction with respect to the base and that is capable of moving the article, in a state where the article is located between the first arm and the second arm, in the second direction and in a direction opposite to the second direction, the movable portion being
capable of causing the article to move between the mobile body and the first transport mechanism in a state where the mobile body is located at the first transfer position, and
capable of causing the article to move between the mobile body and the second transport mechanism in a state where the mobile body is located at the second transfer position, wherein
the support positions of the first arm and the second arm supported by the base in the first direction are changeable, and
in a state where the mobile body is located at the first transfer position, the support position of the second arm supported by the base is fixed and the support position of the first arm supported by the base is changed depending on a length of the article in the first direction, and, alternatively, in a state where the mobile body is located at the second transfer position, the support position of the first arm supported by the base is fixed and the support position of the second arm supported by the base is changed depending on the length of the article in the first direction.

* * * * *